United States Patent
Anderson et al.

(10) Patent No.: US 7,372,998 B2
(45) Date of Patent: May 13, 2008

(54) SYSTEM AND METHOD FOR EFFICIENT NON-OVERLAPPING PARTITIONING OF RECTANGULAR REGIONS OF INTEREST IN MULTI-CHANNEL DETECTION

(75) Inventors: Richard Hugh Anderson, Melbourne, FL (US); Paul David Anderson, Melbourne, FL (US); Edward Ray Beadle, Melbourne, FL (US); John Hubert Henderson, Melbourne, FL (US); John Fitzgerald Dishman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 979 days.

(21) Appl. No.: 10/437,069

(22) Filed: May 14, 2003

(65) Prior Publication Data

US 2004/0228543 A1 Nov. 18, 2004

(51) Int. Cl.
*G06K 9/36* (2006.01)
*H04L 29/00* (2006.01)

(52) U.S. Cl. .................... 382/232; 375/259
(58) Field of Classification Search ............ 382/176, 382/180, 293, 232; 370/521, 330; 704/200, 704/204; 375/259
See application file for complete search history.

(56) References Cited

U.S. PATENT DOCUMENTS

| | | | | |
|---|---|---|---|---|
| 5,852,806 A | * | 12/1998 | Johnston et al. | 704/500 |
| 5,950,151 A | * | 9/1999 | Bernardini et al. | 704/200 |
| 5,991,454 A | * | 11/1999 | Fowler | 382/251 |
| 6,658,382 B1 | * | 12/2003 | Iwakami et al. | 704/224 |
| 6,996,198 B2 | * | 2/2006 | Cvetkovic | 375/350 |
| 7,127,016 B1 | * | 10/2006 | Cvetkovic | 375/350 |
| 7,206,359 B2 | * | 4/2007 | Kjeldsen et al. | 375/316 |
| 2002/0003843 A1 | * | 1/2002 | Martone | 375/262 |
| 2002/0181388 A1 | * | 12/2002 | Jain et al. | 370/208 |

OTHER PUBLICATIONS

Carsteanu et al, "Absolute optimal time—frequency basis—a research tool" J. Phys. A: Math. Gen. 30 (1997) 7133-7146. ☐☐☐☐*

Nayebi et al "The Wavelet Transform and Time-Varying Tiling of the Time-Frequency Plane", Time-Frequency and Time-Scale Analysis, 1992., Proceedings of the IEEE-SP International Symposium, Oct. 4-6, 1992 pp. 147-150 ☐☐.*

(Continued)

*Primary Examiner*—Andrew W. Johns
*Assistant Examiner*—Andrae Allison
(74) *Attorney, Agent, or Firm*—Duane Morris LLP (57) ABSTRACT

A system and method in a multi-channel detection system for multi-rate filter bank applications for converting overlapping rectangular two-dimensional (2D) regions into a new set of non-overlapping rectangular regions for the efficient reconstruction of a signal wherein each non-overlapping region has a maximum extent in a major dimension is described. Overlapping regions are split into marked regions in a non-uniform grid and merged along the major dimension and along the minor dimension to form non-overlapping regions wherein no two non-overlapping rectangular regions have an adjacent edge orthogonal to the major dimension thereby increasing the efficiency of data compression and reducing error-rates.

15 Claims, 6 Drawing Sheets

20 overlapping rectangular regions and the resulting non-uniform 2D grid.

OTHER PUBLICATIONS

Sola et al, "Best Progressive Tiling of the Time-Frequency Plane Based on Fast Time Splitting and Wavelet Transform" Time-Frequency and Time-Scale Analysis, 1994., Proceedings of the IEEE-SP International Symposium on Oct. 25-28, 1994 pp. 132-135.*

Herley et al, "Tilings of the Time-Frequency Plane: Construction of Arbitrary Orthogonal Bases and Fast Tiling Algorithms" IEEE Transactions on Signal Processing. vol. 41. No. 12, Dec. 1993. □□□□*

Herley et al , "Arbitrary orthogonal tilings of the time-frequency plane", Time-Frequency and Time-Scale Analysis, 1992., Proceedings of the IEEE-SP International Symposium, Publication Date: Oct. 4-6, 1992 On pp. 11-14.□□*

Sherif et al, "Binary Image Compressing Using Efficient Partitioning into Rectangular Regions", IEEE Transactions on Communications, vol. 43, No. 5, May 1995.*

Quddas, "A new compression technique for binary text images", Computers and Communications, 1997. Proceedings., Second IEEE Symposium on Jul. 1-3, 1997 pp. 194-198 □□.*

Mohamed, S. and Fahmy, M., "Binary Image Compression Using Efficient Partitioning into Rectangular Regions," IEEE Transactions on Communications, vol. 43, No. 5, May 1995.

Quddus, A. and Fahmy, M., "A New Compression Technique for Binary Text Images," Second IEEE Symposium on Computers and Communications: Proceedings, Jul. 1-3, 1997, Alexandria, Egypt.

* cited by examiner

Figure 1: 20 overlapping rectangular regions and the resulting non-uniform 2D grid.

SYSTEM AND METHOD FOR EFFICIENT NON-OVERLAPPING PARTITIONING OF RECTANGULAR REGIONS OF INTEREST IN MULTI-CHANNEL DETECTION

BACKGROUND

Figure 1:
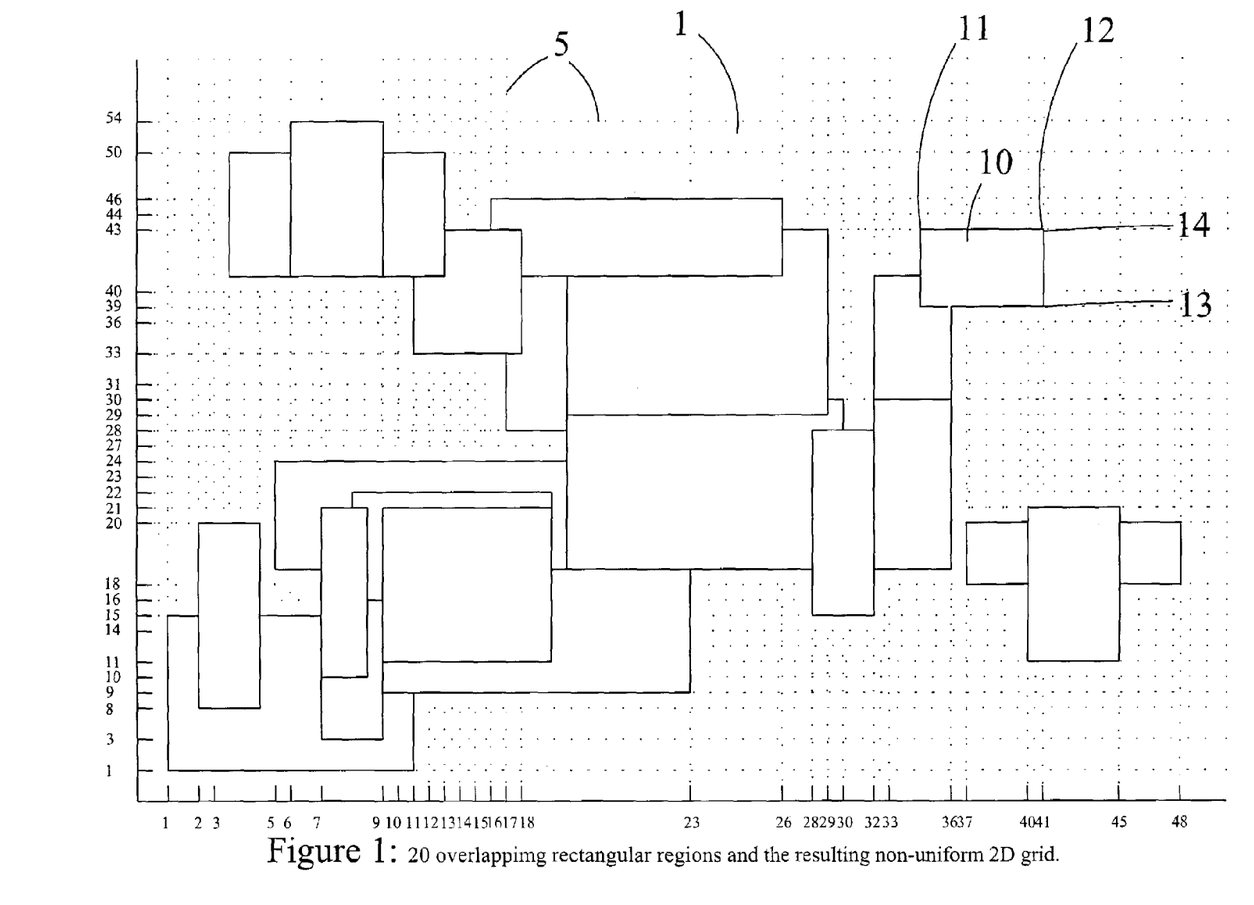
FIG. 1 is a representation of overlapping rectangular regions in a non-uniform grid

In multi-rate filter bank applications (e.g. a wideband channelizer) where overlapping and non-overlapping 2D rectangular regions represent different frequency bands of interest at different times and over different time durations, different layers of frequency resolution can potentially generate overlaps causing multiple detection within one time-frequency cell. These time frequency overlaps result in less efficient compression due to multiple transmissions of the same data. Additionally since signal reconstruction errors increase for smaller time-frequency regions, the most accurate reconstruction corresponds to regions with the largest bandwidth and longest time-duration. FIG. 1 shows twenty exemplary 2D rectangular regions of interest showing the overlaps between different regions.

In binary image coding where the compressed data corresponding to just the locations and sizes of the non-zero "black" regions is sufficient for reconstructing the image, an iterative approach is used. Known methods of binary image coding consists of three main steps: (a) a raster-scan through the columns and then the rows of the image to find the next non-zero pixel corresponding to a top-left corner, (b) a column-wise scan to find the top-right corner at the first zero pixel and (c) a row-wise scan to find either the bottom-left or bottom-right corner corresponding to a zero pixel between the left and right sides or to a non-zero pixel in the columns directly outside the left and right sides. However, this method does not provide the set of non-overlapping regions with either maximum vertical-extent or maximum horizontal-extent. Also, the method cannot be directly applied to a set of overlapping rectangular regions to determine the optimal set of non-overlapping regions.

A known prior art compression technique for binary text images uses a similar approach. The prior art technique partitions the non-zero regions into non-overlapping and fully overlapping regions, defines the vertices and assigns specific codes to the converted rectangular regions' vertices reflective of their status as non-overlapping or fully overlapping regions. This method does not provide a set of non-overlapping rectangular regions encompassing the entire marked area, nor does it allow for a maximum extent in one dimension.

For data compression, error reduction, and other reasons, it is desirable to employ a method for converting overlapping rectangular two-dimensional (2D) regions into a new set of non-overlapping rectangular regions to thereby allow for efficient reconstruction of a signal output from the filter bank. It is further desirable that the above method determine the smallest set of non-overlapping rectangular regions with the maximum extent in either the vertical or the horizontal dimension since signal reconstruction errors are larger for smaller time-frequency regions. The most accurate reconstruction corresponds to regions with the largest bandwidth and longest time duration, i.e. larger time frequency regions.

Accordingly, it is an object of the disclosed subject matter to obviate many of the above problems in the prior art and to provide a novel method in a multi-channel detection system for transforming a plurality of overlapping two-dimensional rectangular regions into non-overlapping 2D rectangular regions wherein each non-overlapping region has a maximum extent in a major dimension (i.e. either horizontally or vertically). An embodiment of the method includes the steps of: splitting the overlapping regions into marked regions in a non-uniform grid; merging the marked grid regions along the major dimension and along the minor dimension to thereby form non-overlapping regions wherein no two non-overlapping rectangular regions have an adjacent edge orthogonal to the major dimension.

It is another object of the disclosed subject matter to provide a novel improvement of a method for compressing data. One embodiment of the method comprises the step of transforming overlapping two-dimensional rectangular regions into non-overlapping 2D rectangular regions wherein the non-overlapping rectangular regions have a maximum extent in one dimension.

It is yet another object of the disclosed subject matter to provide, in a time-frequency window of interest, a novel method of excising the overlapping portion of two-dimensional rectangular areas. An embodiment of the method comprises the steps of forming a non-uniform two-dimensional grid using the coordinates of the overlapping rectangular areas; splitting the overlapping 2D rectangular areas into non-uniform grid units, and combining adjacent tagged grid units into non-overlapping rectangular regions defined by major edges and minor corners.

It is still another object of the disclosed subject matter to provide a novel method of reconstructing a coverage area defined by overlapping two-dimensional rectangular regions with non-overlapping 2D rectangular regions. An embodiment of the method comprises the steps of forming a non-uniform two-dimensional grid using the coordinates of the overlapping rectangular areas; splitting the overlapping 2D rectangular areas into non-uniform grid units; and combining adjacent tagged grid units into non-overlapping rectangular regions defined by major edges and minor corners.

It is an additional object of the disclosed subject matter to provide a novel improvement for a method in a Cartesian space defined by a frequency domain and a time domain for transforming a plurality of overlapping rectangular regions into a plurality of non-overlapping rectangular regions. An embodiment of the method comprises the improvement wherein none of the non-overlapping rectangular regions share a common edge orthogonal to a preferred dimension.

It is still an additional object of the disclosed subject matter to provide, in a time-frequency window of interest, a novel method of excising the overlapping portion of overlapping two-dimensional rectangular areas comprising the step of transforming the overlapping rectangular areas into non-overlapping rectangular areas by the improvement wherein none of the non-overlapping rectangular areas share a common edge orthogonal to a preferred dimension.

These and many other objects and advantages of the disclosed subject matter will be readily apparent to one skilled in the art to which the disclosure pertains from a perusal or the claims, the appended drawings, and the following detailed description of the preferred embodiments.

DETAILED DESCRIPTION

A method according to an embodiment of the disclosed subject matter comprises three steps: (1) determining a non-uniform 2D grid corresponding the all the overlapping rectangular region boundaries, (2) determining the non-uniform grid rectangles covered by one or more of the overlapping rectangles and (3) combining directly adjacent covered grid regions to find the smallest set of non-overlapping rectangles with the maximum extent either vertically or horizontally.

For the $i^{th}$ 2D rectangular region $R_i$ 10 in a set of N possibly overlapping rectangular regions 1 as shown in FIG. 1, let $x_{0,i}, x_{1,i}, y_{0,i}, y_{1,i}$ denote the minimum (left) x-value 11, maximum (right) x-value 12, minimum (bottom) y-value 13 and maximum (top) y-value 14, respectively. The four vectors $x_0 = [x_{0,1}, x_{0,2}, \ldots, x_{0,N}]^T$, $x_1 = [x_{1,1}, x_{1,2}, \ldots, x_{1,N}]^T$, $y_0 = [y_{0,1}, y_{0,2}, \ldots, y_{1,N}]^T$ represent the 4N corner locations of all N rectangles (where $[\ ]^T$ is the transpose vector). It is desirable to find the set of non-overlapping rectangular regions covering the same areas as the overlapping regions and with the maximum extent in the "major" dimension. Without loss of generality, the vertical dimension is assumed to be the "major" dimension in the current discussion, wherein the vertical dimension or horizontal dimension may correspond to parameters such as time or frequency. The other dimension is then defined as the minor dimension. For the case where the "major" dimension is horizontal, $x_0$ is interchanged with $y_0$ and $x_1$ with $y_1$.

Determining a Non-uniform Grid

An initial step in an embodiment of the disclosure is to define a non-uniform grid corresponding to the unique x-values and unique y-values of a set of possibly overlapping rectangular regions. Let the $N_x \times 1$ vector $x_g$ denote the unique x values in the $2N \times 1$ vector $[x_0^T, x_1^T]^T$, sorted in ascending order, i.e. $\min(x_0) = x_{g,1} < x_{g,2} < \ldots < x_{g,N_x} = \max(x_1)$. Similarly, let the $N_y \times 1$ vector $y_g$ denote the sorted unique y values in the vector $[y_0^T, y_1^T]^T$, i.e. $\min(y_0) = y_{g,1} < y_{g,2} < \ldots < y_{g,N_y} = \max(y_1)$. FIG. 1 shows an example of a set of 20 randomly generated overlapping rectangular regions (i.e. N=20), some of which overlap others, and the resulting non-uniform 2D grid derived from the unique x and y values of the rectangular regions. The non-uniform grid is shown by the dashed-lines 5 and tick-marks along each axis. The solid lines indicate the edges of the different rectangular regions. By the definitions of $x_g$ and $y_g$, the number of grid points is $(N_x N_y) \leq (2N)^2$. In FIG. 1, $N_x = N_y = 29$ and $2N = 40$.

Determining the Non-uniform Grid Regions Covered by Rectangles

A latter step in the process is to determine which single row/single column non-uniform grid regions are covered by one or more of the rectangular regions represented by $x_0$, $x_1$, $y_0$, and $y_1$. Let the $N_y \times N_x$ matrix C be a coverage indicator matrix where $C_{i,j} = 1$ if $x_{0,n} \leq x_{g,j} < x_{1,n}$ and $y_{0,n} \leq y_{g,i} < y_{1,n}$ for any $n = 1, \ldots, N$ and otherwise $C_{i,j} = 0$. The small dot symbols 22 in FIG. 2 indicate the non-zero elements in C 20 for the rectangular regions shown in FIG. 1, note that the x and y axes of FIG. 2 have been transformed to represent the cardinality of the unique x and y values, respectively. The last row and last column of C consist of all zeros (shown as blanks) in FIG. 2, since $x_{0,n} < x_{1,n} \leq x_{g,N_x}$ and $y_{0,n} < y_{1,n} \leq y_{g,N_y}$ for any $n = 1, \ldots, N$. At this point, a set of non-overlapping single column or single row rectangles can be found directly from the row and column indices of the non-zero elements of matrix C 20. However, this set of covered grid rectangle regions corresponds to the largest partitioning of the covered regions. A much more efficient partitioning results from grouping multiple covered grid regions that are directly adjacent to each other.

Combining Directly Adjacent Covered Grid Regions

Figure 2:
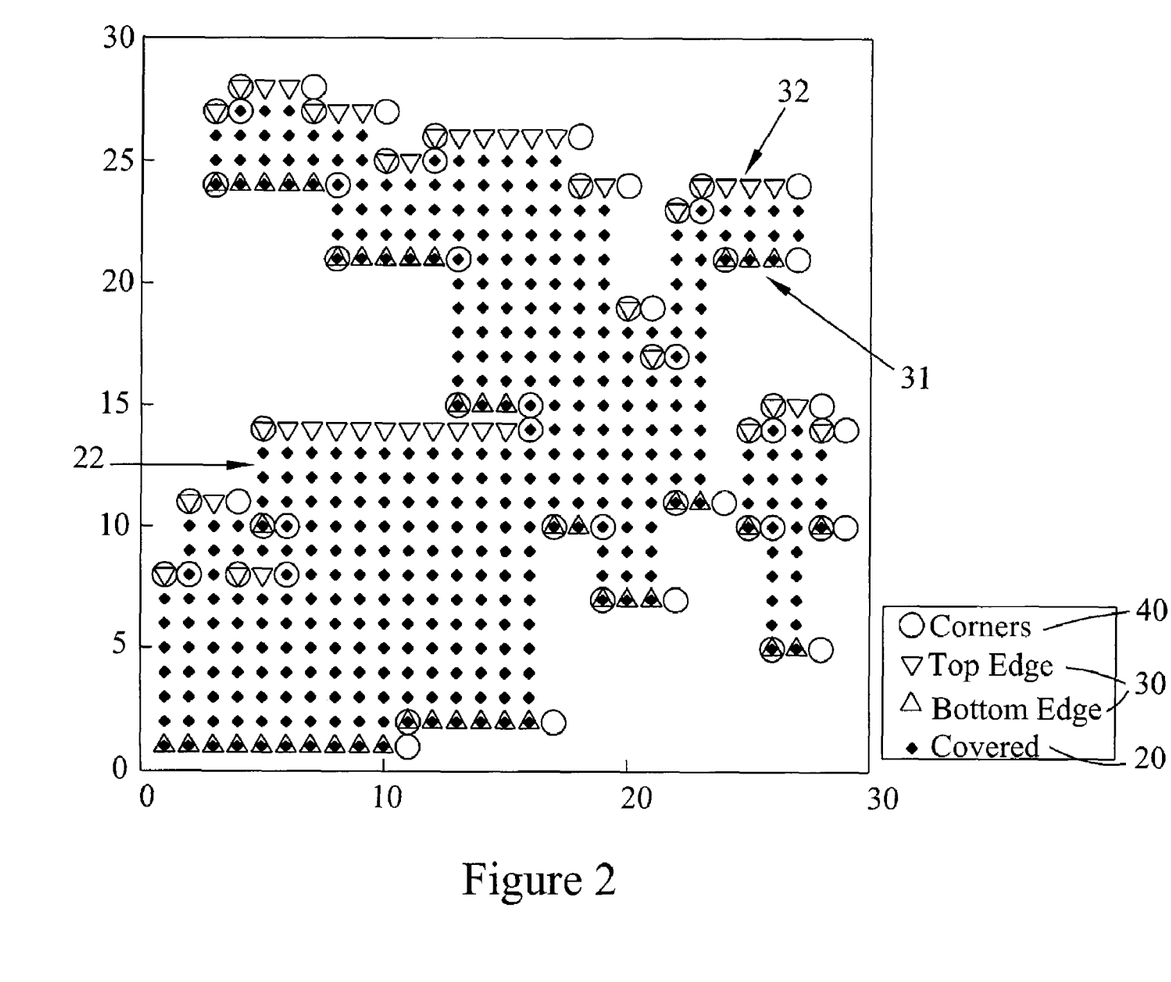
FIG. 2 is a representation of the coverage indicator matrix for the overlapping rectangular regions in FIG. 1.

To determine a smaller set of non-overlapping rectangles, adjacent covered grid regions are grouped or merged, first in the major (vertical) dimension and second in the minor (horizontal) dimension. Again the major and minor dimensions are assigned for illustration only and are not intended to be limiting the embodiment of the disclosed subject matter in anyway. Grouping adjacent covered grid regions can be equivalently expressed in terms of edge-detection for the "binary image" formed by the coverage matrix C 20. The top and bottom "edges" in C 20 correspond to the non-zero $1^{st}$-order differences in the rows of C 20. Since any "ones" (small dots 22) in the $1^{st}$ row of C 20 correspond to bottom edges of tall-narrow single column rectangles, let the $1^{st}$-order row-difference matrix be defined as $$[C_{\Delta y}]_{i,j} = \begin{cases} C_{i,j}, & i = 1 \\ C_{i,j} - C_{i-1,j}, & i > 1 \end{cases}$$

The rows of the non-zero elements of $C_{\Delta y}$ 30 correspond to either bottom edges 31, where $[C_{\Delta y}]_{i,j} = 1$, or top edges 32, where $[C_{\Delta y}]_{i,j} = -1$, as shown in FIG. 2. The set of multiple-row/single-column non-overlapping rectangles can be represented by the row and columns indices of the non-zero elements of $C_{\Delta y}$ 30. Let the $N_C \times 1$ vectors $e_{y_0}$ and $e_{y_1}$ denote the row indices corresponding to positive 1 and negative 1 elements in $C_{\Delta y}$ 30, i.e. the bottom edges and top edges, respectively. Let the $N_C \times 1$ vector $e_{x_0}$ likewise denote the column indices corresponding to the positive "1" elements in $C_{\Delta y}$ 30. It is assumed that the index vector $e_{x_0}$ is formed via a "raster-scan" down the $1^{st}$ column of $C_{\Delta y}$ 30, then the $2^{nd}$ column, and so on.

The next step is to group any multiple-row/single-column rectangles in adjacent columns that have identical row indices. This can be performed via a corner-detection process similar to the previous edge-detection step. Since the corners of the multiple-row/multiple-column rectangles are desired, $1^{st}$-order differences are computed across the columns of $C_{\Delta y}$ rather than C itself. Let the $N_y \times N_x$ matrix $C_{\Delta x \Delta y}$ 40 denote the column-wise $1^{st}$-order differences of $C_{\Delta y}$ 30, i.e.

$$[C_{\Delta x \Delta y}]_{i,j} = \begin{cases} [C_{\Delta y}]_{i,j}, & j = 1 \\ [C_{\Delta y}]_{i,j} - [C_{\Delta y}]_{i,j-1}, & j > 1 \end{cases}$$

The bottom-left and top-right corners correspond to where $C_{\Delta x \Delta y} = 1$ while the top-left and bottom-right corners correspond to where $C_{\Delta x \Delta y} = -1$. The locations of the corners, as well as the top and bottom edges, are shown in FIG. 2. The squares, triangles and circles correspond to non-zero elements of C 20, $C_{\Delta y}$ 30, and $C_{\Delta x \Delta y}$ 40, respectively. The top and bottom edges are further indicated by the orientation of the triangle symbols. The bottom edges coincide with non-zero elements of C 20, while the top-edges do not.

Given the matrix $C_{\Delta x \Delta y}$ 40 and index vectors $e_{y_0}$, $e_{y_1}$, and $e_{x_0}$, the multiple-row/multiple-column non-overlapping rectangles can be determined according to an embodiment of the disclosed subject matter via the following procedure.

Let n=1 and let $N_y \times N_x$ matrix D=0.

For i=1, ... $N_C$, let $i_y=[e_{y_0}]_i$ and $i_x=[e_{x_0}]_i$

If $D_{i_y,i_x}=0$, then

Assign $[\tilde{e}_{y_0}]_n=[e_{y_0}]_i$, $[\tilde{e}_{y_1}]_n=[e_{y_1}]_i$, and $[\tilde{e}_{x_0}]_n=[e_{x_0}]_i$, and let $m_y=[e_{y_1}]_i$.

Let $b_j = \begin{cases} 0, & j \le i_x \\ \sum_{m=i_y}^{m_y} |[C_{\Delta x \Delta y}]_{m,j}|, & j > i_x \end{cases}$.

Let $m_x$ denote the index of the first non-zero element of vector b.

Assign $[\tilde{e}_{x_1}]_n=m_x$ and $D_{r,c}=1$ for $i_y \le r \le m_y$ and $i_x \le c \le m_x$.

Increment n=n+1

Each element of matrix D indicates if the grid-region corresponding to that row and column has already been assigned to a multiple-row/multiple-column rectangle. The $N_x \times 1$ vector b indicates if matrix $C_{\Delta x \Delta y}$ 40 has any non-zero elements from row $i_y$ to row $m_y$ in the columns greater than $i_x$. It is used to find the right-edge of the multiple-row/multiple-column rectangle with bottom-left at $(i_x,i_y)$ and top-left at $(i_x,m_y)$. The vectors, $\tilde{e}_{x_0}$, $\tilde{e}_{y_0}$, $\tilde{e}_{x_1}$ and $\tilde{e}_{y_1}$ consist of the indices corresponding to the bottom-left and top-right corners of the multiple-row/multiple-column non-overlapping rectangles. The non-overlapping rectangles on the non-uniform grid correspond to the vectors $\tilde{x}_0$, $\tilde{x}_0$, $\tilde{y}_0$ and $\tilde{y}_1$ with elements given by $[\tilde{x}_0]_i=x_g([\tilde{e}_{x_0}]_i)$, $[\tilde{x}_1]_i=x_g([\tilde{e}_{x_1}]_i)$, $[\tilde{y}_0]_i=y_g([\tilde{e}_{y_0}]_i)$ and $[\tilde{y}_1]_i=y_g([\tilde{e}_{y_1}]_i)$, respectively.

Figure 4:
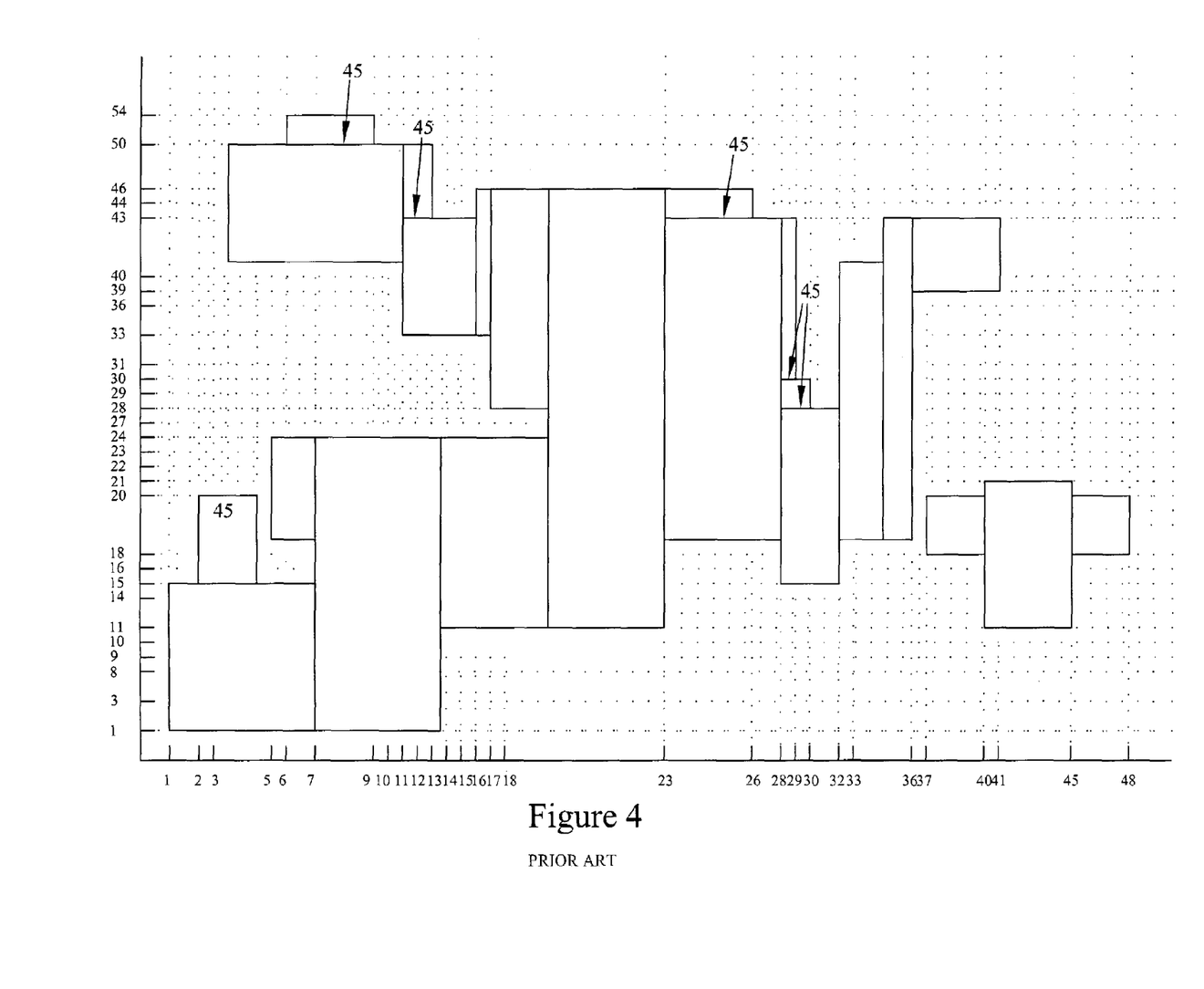
FIG. 4 is a representation of non-overlapping rectangular regions created from the overlapping rectangular regions in FIG. 1 according to known prior art.

For comparison, non-overlapping regions determined based on the prior art approach are shown in FIG. 4. The prior art and the disclosed methods differ in how the non-overlapping regions are determined from the coverage indicator matrix C.

Figure 3:
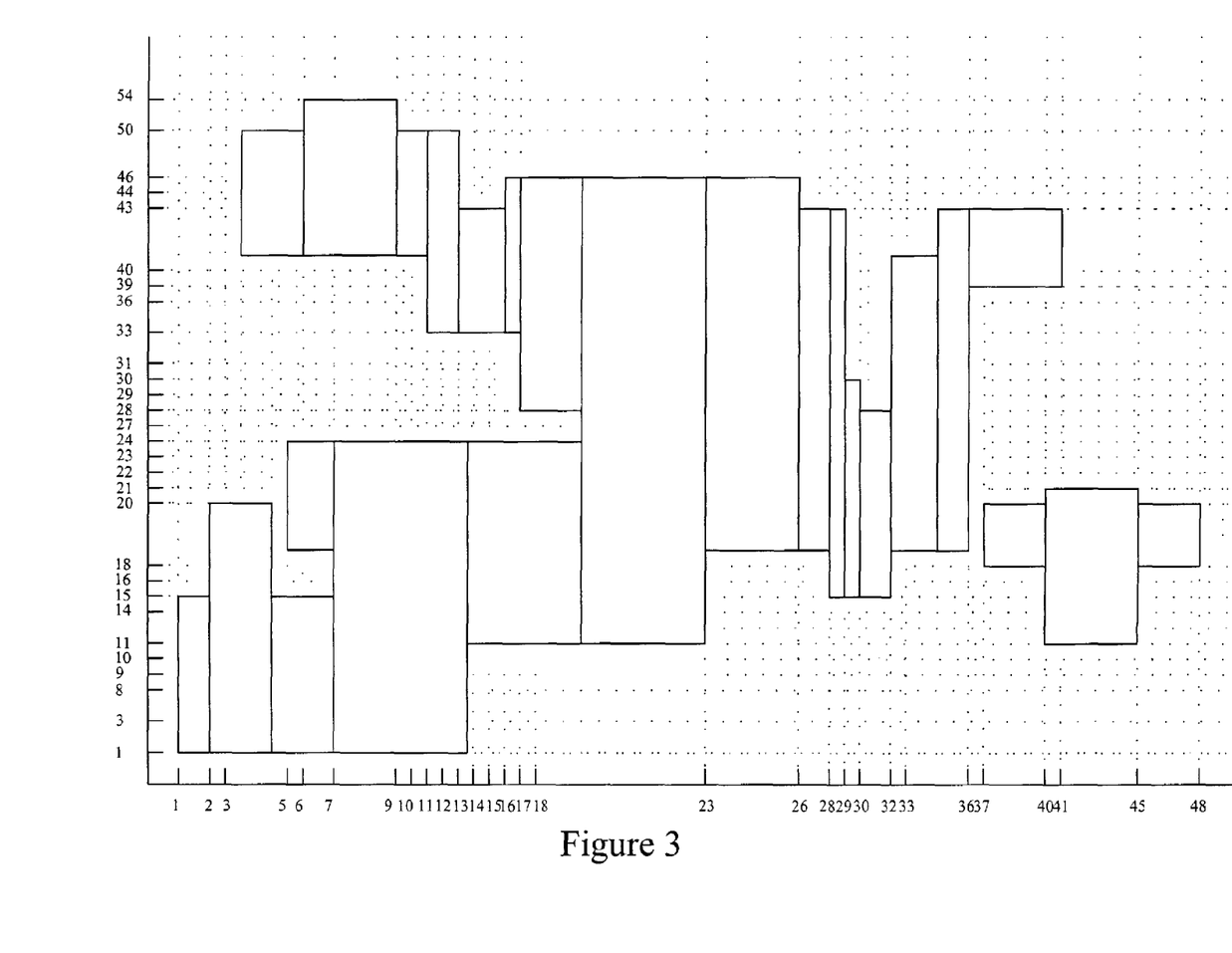
FIG. 3 is a representation of the non-overlapping rectangular regions created from the overlapping rectangular regions in FIG. 1 according to an embodiment of the disclosed subject matter.

For the example of rectangles regions shown in FIG. 1, the resulting non-overlapping rectangles, computed via the steps above for an embodiment of the disclosed subject matter, are shown in FIG. 3. All the non-overlapping rectangles in FIG. 3 extend over multiple vertical grid regions and several extend over multiple horizontal grid regions.

The rectangles in FIG. 3 may be directly adjacent to each other in the minor dimension, i.e. horizontally (with a right-edge against a left-edge), but not in the major dimension, i.e. vertically (with a top-edge against a bottom-edge). In other words, between any two rectangles there are no adjacent edges orthogonal to the major dimension. This feature is desirable in signal reconstruction from multi-rate filter banks where the errors in the reconstructed signal tend to increase with channelization into narrower bandwidth channels. Similarly with reconstruction filter banks, the reconstruction improves for longer time durations so the desired rectangular regions should have the maximum time-extent for each sub-channel.

The non-overlapping regions determined from matrix C using the prior art method are shown in FIG. 4. While the number of non-overlapping rectangles is smaller with the prior art approach, 23 versus 25 for the above described embodiment of the inventive method, the vertical extent (major dimension) is not maximized for a fixed value of x using the prior art approach. This can be seen from the occurrence of regions 45, as shown in FIG. 4, that are adjacent to other regions directly above or below, i.e. with top-edges against bottom edges.

Figure 5:
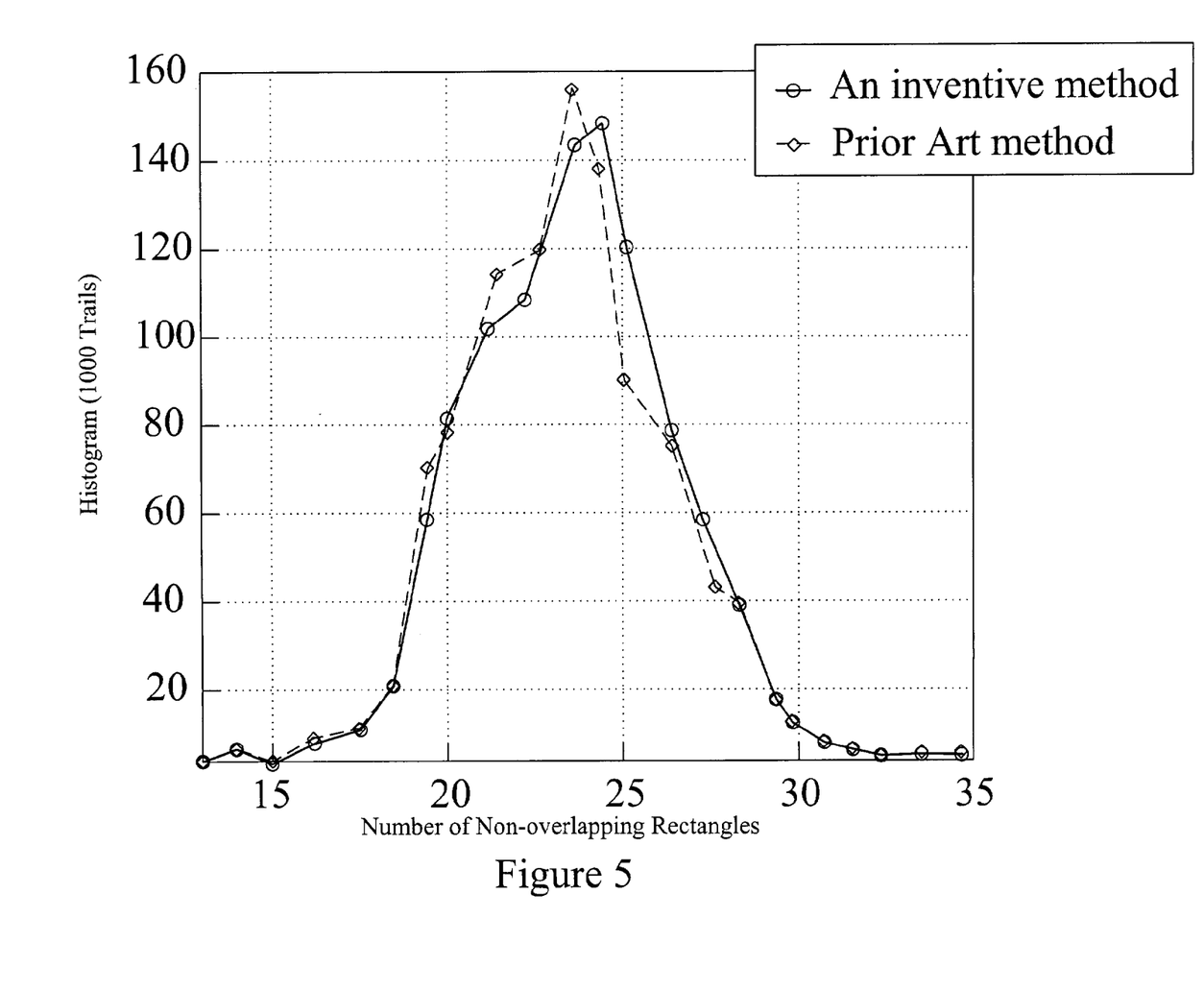
FIG. 5 is a graph relating number of non-overlapping rectangular regions obtained via the disclosed subject matter and known prior art.

An embodiment of the disclosed subject matter generally gives a larger number of rectangles due to the constraint on the extent of the rectangles in the major dimension. This can be seen from the two histograms shown in FIG. 5, where the mode of the embodiment of the disclosed subject matter's histogram is generally to the right of the mode of the prior art histogram. However, the number of non-overlapping regions resulting from using the above described inventive embodiment of the disclosed subject matter is typically only slightly larger than the number of non-overlapping regions resulting from using the prior art.

Figure 6:
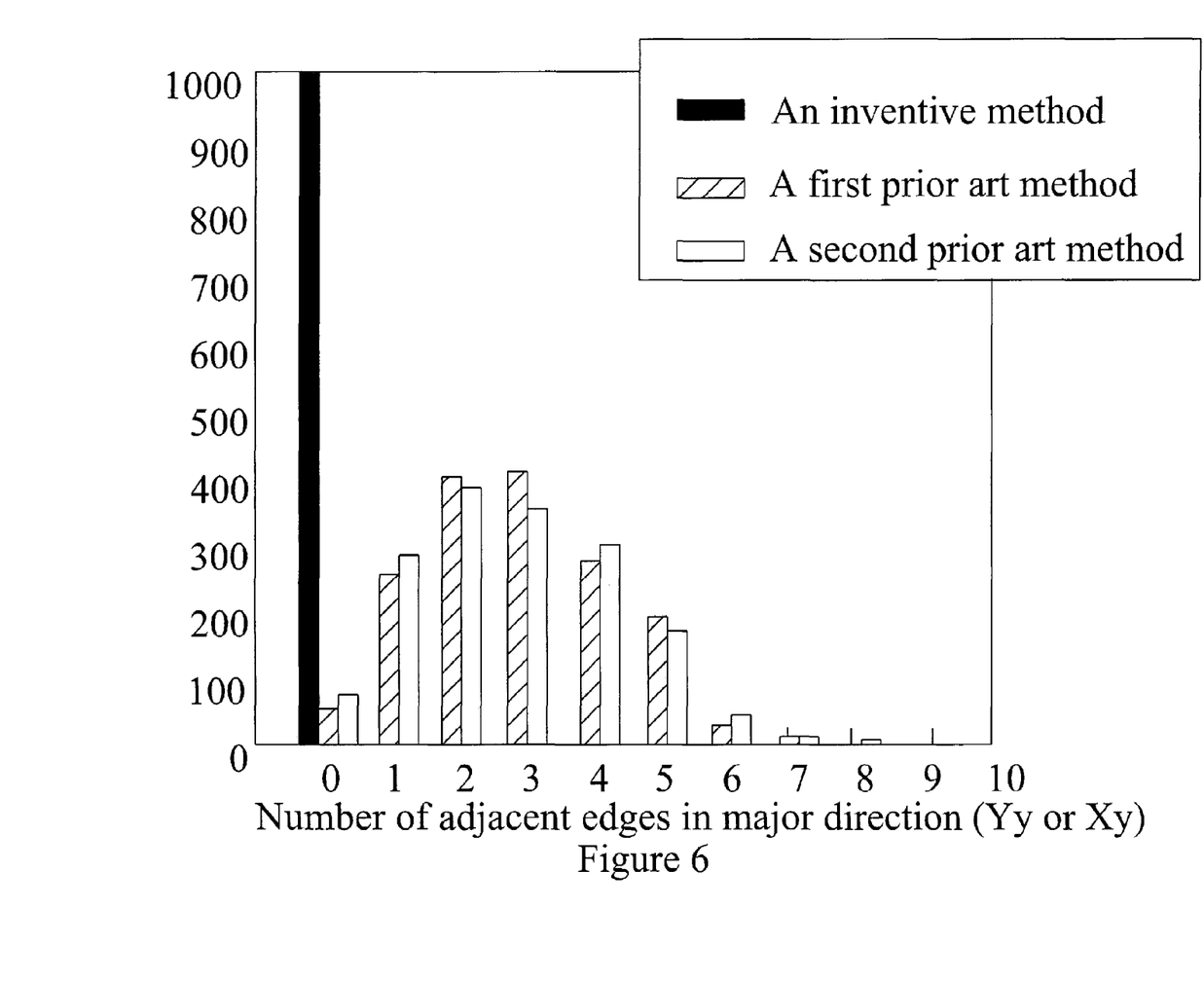
FIG. 6 is a graph relating the number of adjacent edges in a preferred dimension for an embodiment of the disclosed subject matter and a known prior art method.

The performance of the two methods with respect to maximizing the extent of the non-overlapping regions in the major dimension can be measured from the number of undesirable shared edges between any two regions. When the major dimension is vertical, this corresponds to the number of times a non-overlapping region is directly above or below another region, i.e. bottom-edge against top-edge. In FIG. 6, the histograms of the number of undesirable shared edges are shown for the prior art and an inventive embodiment of the disclosed subject matter. Two histograms are shown for the prior art, corresponding to row-then-column and column-then-row raster-scans. Based on 1000 Monte Carlo trials, the method according to an embodiment of the disclosed subject matter had no undesirable edges, adjacent edges orthogonal to the major dimension. In contrast, the prior art results in adjacent non-overlapping regions in the major dimension regardless of the order of the raster-scan.

In an embodiment of the disclosed subject matter, rectangular regions defining bandwidth, time slots or other particular sets of values, may likewise by implemented. Hard indices can be established for rectangular regions which restrict merging with adjacent covered regions in the dimension of interest. An embodiment can also use erosion and/or dilation morphological operations on the coverage indicator matrix, or "image", to avoid situations with many closely spaced but not directly adjacent time-frequency regions corresponding to greater computation than that for a few larger time-frequency regions over the same areas.

In another embodiment of the disclosed subject matter, the above described procedure may be implemented in machine readable software code, in firmware, or in hardware including, but not limited to integrated circuits (IC), application specific integrated circuits (ASICs), printed wiring boards (PWB), discrete logic circuits, etc.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal thereof.

We claim:

1. In a time-frequency window of interest, a method of excising overlapping portions of a set of two dimensional rectangular areas positioned in a plane with two orthogonal axes defining a major dimension and a minor dimension comprising the steps of:

(a) forming a non-uniform two dimensional grid using corner coordinates defining each of the rectangular areas in the set;
(b) transforming a coverage area of the set into a corresponding coverage area in the non-uniform grid, thereby creating a plurality of covered non-uniform grid units;
(c) combining adjacent covered non-uniform grid units into a second set of non-overlapping rectangular regions defined by edges in the major dimension and corners in the minor dimension.

2. The method of claim 1, wherein the major dimension is a frequency domain and the minor dimension is a time domain.

3. The method of claim 1, wherein the major dimension is a time domain and the minor dimension is a frequency domain.

4. The method of claim 1, wherein no two of the rectangular areas in the set of the non-overlapping rectangular areas share an adjacent edge orthogonal to the major dimension.

5. The method of claim 1, wherein the step of forming a non-uniform two dimensional grid comprises the steps of:
(a) ordering distinct major dimension corner coordinate values defining the rectangular areas in the set of overlapping rectangular areas and assigning sequential integers to each of the distinct major dimension coordinate values;
(b) ordering distinct minor dimension corner coordinate values defining the rectangular areas in the set of overlapping rectangular areas and assigning sequential integers to each of the distinct minor dimension coordinate values.

6. The method of claim 5, wherein the step of transforming a coverage area of the set into a corresponding coverage area in the non-uniform grid includes the steps of:
(a) replacing the major and minor dimension corner coordinate values defining the rectangular areas with the assigned integers, thereby creating non-uniform rectangular area coordinates; and,
(b) covering each non-uniform grid unit within the non-uniform rectangular area defined by the non-uniform rectangular area coordinates, thereby forming covered non-uniform grid units.

7. The method of claim 1, wherein the step of combining adjacent covered non-uniform grid units into a second set of non-overlapping rectangular regions defined by edges in the major dimension and corners in the minor dimension comprises the steps of:
(a) combining adjacent covered non-uniform grid units along the major dimension there by forming covered sets of covered non-uniform rectangular area, each set one non-uniform grid unit in width in the minor dimension bound in by major dimension edges in the major dimension;
(b) combining the adjacent covered sets strips sharing the same major edges in the minor dimension forming a second set of non-overlapping rectangular regions with a maximum extent in the major dimension.

8. A method of transforming a plurality of rectangular regions, wherein two or more of the rectangular regions overlap, into a plurality of non-overlapping rectangular regions comprising the steps of:
determining a non-uniform two dimensional grid corresponding the rectangular region boundaries;
determining non-uniform grid rectangles covered by one or more of the plurality of rectangular regions; and,
combining directly adjacent covered grid rectangles to obtain the smallest set of non-overlapping rectangles with a maximum extent in a major dimension.

9. The method of claim 8 comprising the step of determining a coverage indicator matrix C.

10. The method of claim 9 comprising the step of using C to determine an first order difference matrix $C_{\Delta y}$ defining the extent in the major dimension of the non-overlapping rectangular regions.

11. The method of claim 10, comprising the step of determining a second first order difference matrix $C_{\Delta x \Delta y}$ defining the corners.

12. The method of claim 11, comprising the step of using C, $C_{\Delta y}$, $C_{\Delta x \Delta y}$ to determine indices for regions with adjacent covered grids in the major dimension.

13. The method of claim 12, wherein the regions with adjacent covered grids are combined with adjacent regions with the same indices.

14. A time-frequency window of interest for excising the overlapping portion of two-dimensional rectangular areas comprising:
means for forming a non-uniform two-dimensional grid using the corner coordinates of the overlapping rectangular areas;
means for splitting the overlapping 2D rectangular areas into covered non-uniform grid units; and,
means for combining adjacent covered non-uniform grid units into non-overlapping rectangular regions defined by major edges and minor corners.

15. A system for transforming a plurality of rectangular regions, wherein two or more of the rectangular regions overlap, into a plurality of non-overlapping rectangular regions comprising:
means for determining a non-uniform 2D grid corresponding the rectangular region boundaries;
means for determining non-uniform grid rectangles covered by one or more of the plurality of rectangular regions; and,
means for combining directly adjacent covered grid rectangles to obtain the smallest set of non-overlapping rectangles with a maximum extent in a major dimension.

* * * * *